(12) United States Patent
Sandri et al.

(10) Patent No.: US 12,146,537 B2
(45) Date of Patent: Nov. 19, 2024

(54) SUSPENSION DEVICE OF A MOTOR-VEHICLE WHEEL

(71) Applicant: C.R.F. Società Consortile per Azioni, Orbassano (IT)

(72) Inventors: Silvano Sandri, Orbassano (IT); Carlo Pavesio, Turin (IT); Dario Scantamburlo, Turin (IT); Renato Badino, Turin (IT); Stefano Lucà, Turin (IT)

(73) Assignee: C.R.F. Società Consortile per Azioni, Orbassano Torino (IT)

( * ) Notice: Subject to any disclaimer, the term of this patent is extended or adjusted under 35 U.S.C. 154(b) by 332 days.

(21) Appl. No.: 17/621,069

(22) PCT Filed: Jun. 16, 2020

(86) PCT No.: PCT/IB2020/055612
§ 371 (c)(1),
(2) Date: Dec. 20, 2021

(87) PCT Pub. No.: WO2020/254957
PCT Pub. Date: Dec. 24, 2020

(65) Prior Publication Data
US 2022/0333655 A1    Oct. 20, 2022

(30) Foreign Application Priority Data

Jun. 21, 2019  (EP) ..................... 19181616

(51) Int. Cl.
*F16D 65/00* (2006.01)
*B33Y 80/00* (2015.01)
(Continued)

(52) U.S. Cl.
CPC .......... *F16D 65/0068* (2013.01); *B33Y 80/00* (2014.12); *F16D 65/128* (2013.01);
(Continued)

(58) Field of Classification Search
CPC .. F16D 65/0068; F16D 65/128; F16D 65/847; F16D 2055/0012;
(Continued)

(56) References Cited

U.S. PATENT DOCUMENTS 4,473,139 A * 9/1984 Oka ...................... F16D 65/847
188/71.6
9,371,874 B2 * 6/2016 Previtali ............... F16D 55/228
(Continued)

FOREIGN PATENT DOCUMENTS

CN      205113605 U     3/2016
DE   102017210834 A1   12/2018
(Continued)

OTHER PUBLICATIONS

International Search Report and Written Opinion dated Oct. 2, 2020. 14 pages.
(Continued)

*Primary Examiner* — Thomas W Irvin
(74) *Attorney, Agent, or Firm* — RMCK Law Group PLC (57) ABSTRACT

A suspension device of a motor-vehicle wheel includes a support member of the motor-vehicle wheel connectable to the motor-vehicle structure by means of one or more suspension members, a brake disc connected in rotation with the motor-vehicle wheel, a brake caliper associated with the brake disc and a brake disc cover. The brake caliper is formed in a single piece with the support member of the motor-vehicle wheel by means of additive manufacturing technology.

16 Claims, 6 Drawing Sheets

(51) Int. Cl.
*B62D 7/18* (2006.01)
*F16D 65/12* (2006.01)
*F16D 65/847* (2006.01)
*B22F 10/28* (2021.01)
*F16D 55/00* (2006.01)
*F16D 65/02* (2006.01)

(52) U.S. Cl.
CPC ............ *F16D 65/847* (2013.01); *B22F 10/28* (2021.01); *B60G 2200/144* (2013.01); *F16D 2055/0012* (2013.01); *F16D 2055/0037* (2013.01); *F16D 2065/1328* (2013.01)

(58) Field of Classification Search
CPC ..... F16D 2055/0037; F16D 2065/1328; B22F 10/28; B33Y 80/00; B60G 2200/144; B62D 7/18
See application file for complete search history.

(56) References Cited

U.S. PATENT DOCUMENTS

| | | | | |
|---|---|---|---|---|
| 10,458,496 | B2* | 10/2019 | Grabiec | F16D 65/847 |
| 10,895,298 | B2* | 1/2021 | Pavesio | B62D 7/18 |
| 11,118,642 | B2* | 9/2021 | Barale | F16D 65/0062 |
| 2004/0108174 | A1* | 6/2004 | Baylis | B60T 1/065 |
| | | | | 188/73.1 |
| 2004/0200676 | A1* | 10/2004 | Chang | F16D 55/36 |
| | | | | 188/162 |
| 2019/0107162 | A1* | 4/2019 | Pavesio | B60G 3/145 |
| 2019/0390724 | A1* | 12/2019 | Barale | F16D 65/0068 |

FOREIGN PATENT DOCUMENTS

| | | | | |
|---|---|---|---|---|
| EP | 1826446 A1 * | 8/2007 | ............ | F16D 55/22 |
| EP | 3128200 A1 | 2/2017 | | |
| EP | 3470248 A1 | 4/2019 | | |
| JP | S5730425 U | 2/1982 | | |
| JP | H01004928 U | 1/1989 | | |
| JP | 2016102573 A | 6/2016 | | |
| WO | 2018154502 A1 | 8/2018 | | |

OTHER PUBLICATIONS

Nugue, Audrey, "Poly-Shape, leader de la fabrication additive", Jun. 30, 2017, http://www.poly-shape.com/parutions/juin/Romain_Dumas.pdf.
Japanese Notice of Reasons for Rejection. 5 pages.
Brazilian Office Action issued on Jul. 2, 2024 A(translation).
1 Korean Office Action dated Jul. 31, 2024. 7 pages.

* cited by examiner

SUSPENSION DEVICE OF A MOTOR-VEHICLE WHEEL

CROSS-REFERENCE TO RELATED APPLICATIONS

This application is a 371 National Stage of International Application No. PCT/IB2020/055612, filed Jun. 16, 2020, which claims priority to European Patent Application No. 19181616.4 filed Jun. 21, 2019. The disclosure of each of the above applications is incorporated herein by reference in its entirety.

FIELD OF THE INVENTION

The present invention relates to a suspension device of a motor-vehicle wheel of the type including:
- a motor-vehicle wheel support member, connectable to the motor-vehicle structure by means of one or more suspension members,
- a brake disc connected in rotation with the wheel of the motor-vehicle,
- a brake caliper associated with said brake disc and
- a brake disc cover rigidly connected to said support member and at least partially surrounding said brake disc.

PRIOR ART

Figure 1:
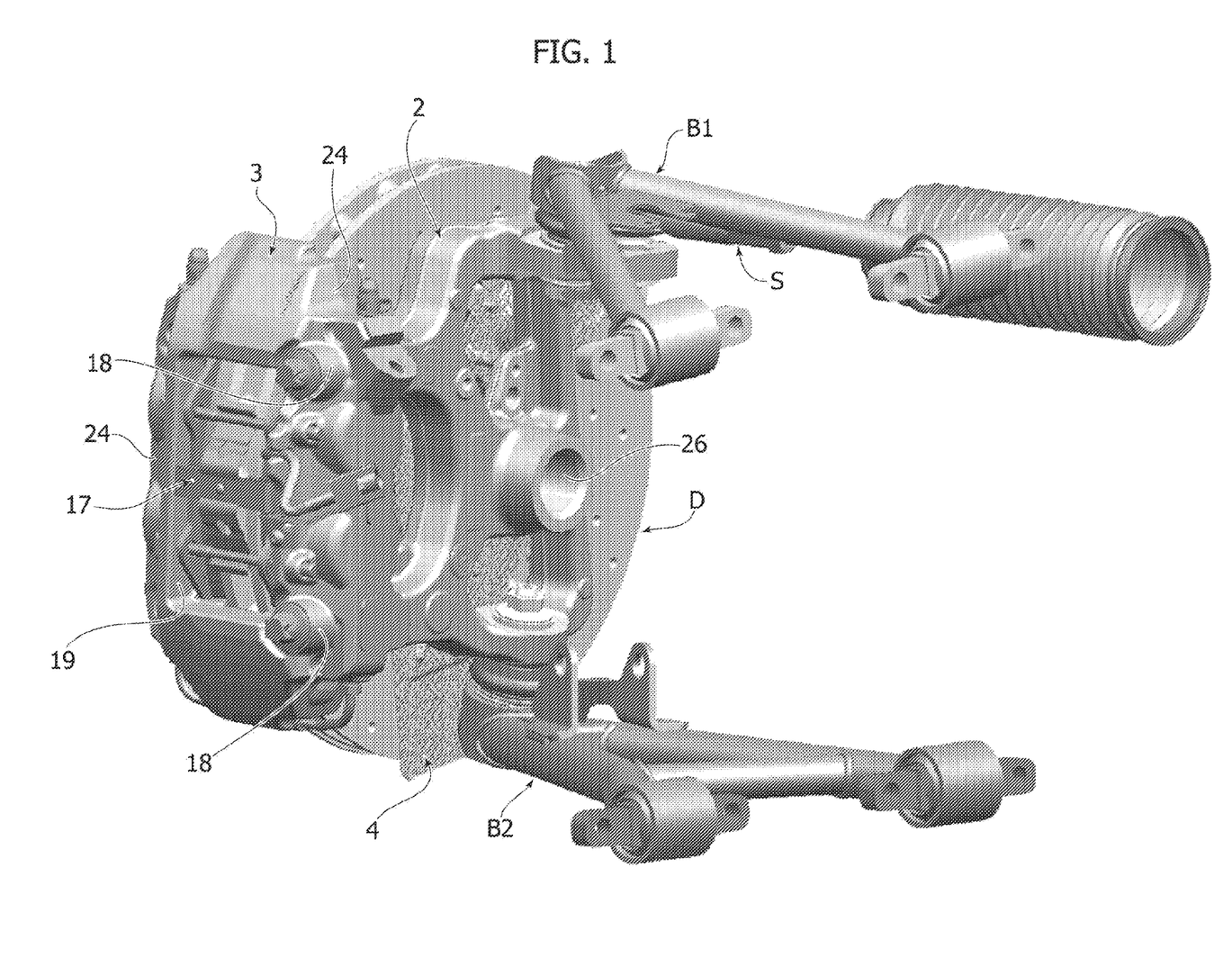
FIGS. 1, 2, already described above, illustrate a suspension device for a motor-vehicle wheel, known and considered herein.
Figure 2:
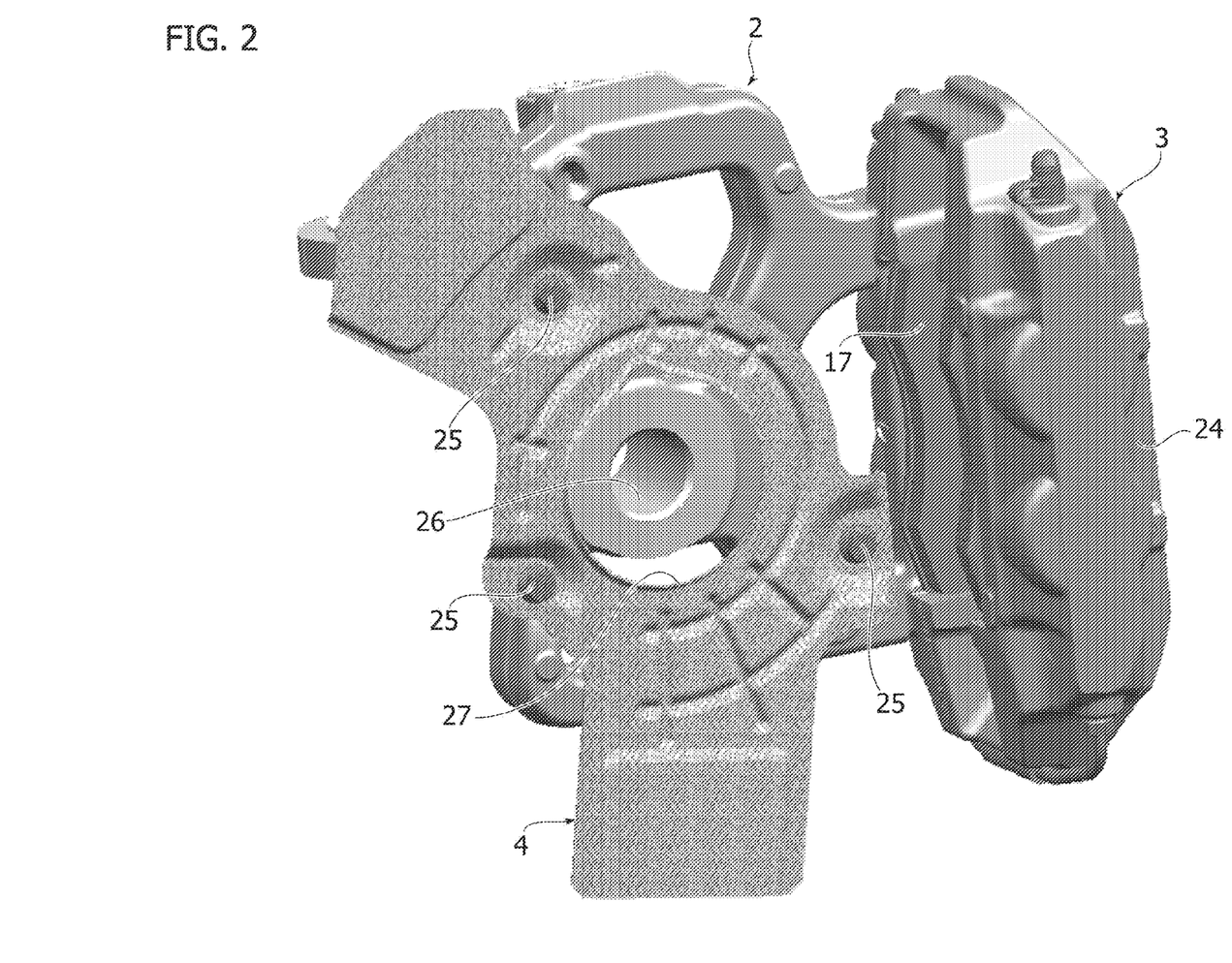

FIGS. 1 and 2 of the attached drawings show a motor-vehicle wheel suspension device of the type specified above, which has already developed in the past by the same applicant.

With reference in particular to FIG. 1, which shows a perspective view of the known type of device, the suspension device comprises a support member 2 of a motor-vehicle wheel, which can be connected to the structure of the motor-vehicle by means of several suspension elements, in particular two pairs of pivoting arms B1, B2. The support member 2 comprises a central perforated portion 26 arranged to receive therein one end of a motor-vehicle axle shaft, which is connected in rotation to a wheel pin, so that the assembly consisting of the wheel pin and the central body of the wheel hub is rotatably supported by the support member 2. The constructive details relating to the way in which the pivoting arms B1, B2 are anchored to the structure of the motor-vehicle, and how the motor-vehicle wheel is connected to the support member 2, are not presented here, since these details can be made in any known way, and also as elimination of these details from the drawings makes them more readily and easily understood.

As illustrated in FIG. 1, the present device, of a known type, comprises a brake disc D connectable in rotation to the wheel of the motor-vehicle. According to a consolidated technique, the disc D, made for example of cast iron or steel, forms part of a braking system, of the disc brake type, integral with the wheel of the motor-vehicle.

The support member 2 further comprises a pair of attachment points 18 arranged for connection with a brake caliper 3, configured to exert a braking action on the motor-vehicle by pushing a pair of pads made of friction material against two opposite braking surfaces of the brake disc D.

In the device of the known type illustrated in FIGS. 1, 2, the brake caliper 3 is of the fixed type and comprises a main body having a pair of elongated side portions 24, each facing a braking surface of the disc D, and a pair of bridge portions that connect the ends of the elongated side portions 24 and define a ventilation opening 19. A pad-carrying body 17 is arranged between the elongated side portions 24 of the caliper 3, and is arranged to cooperate with the braking surfaces of the brake disc D.

The elongated side portions 24 have at least two cavities at the respective faces that face the braking surfaces of the disc D, arranged to receive actuators (for example, hydraulic) configured to exert a thrust action on the brake pads carried by the pad-carrying body 17, stopping them against the braking surfaces of the disc D, so as to exert a braking action on the motor-vehicle. The main body of the brake caliper 3 can be made of metal such as aluminum, or an aluminum alloy.

The use of auxiliary systems has been known for a long time to improve the functionality of a disc brake braking system, such as a brake disc cover.

As shown in particular in the perspective view of FIG. 2, which shows the details of FIG. 1 without the brake disc D and the pivoting arms B1, B2, a brake disc cover 4 is rigidly connected to the support member 2, and is configured to at least partially surround the brake disc D.

The brake disc cover 4 is rigidly connected, by means of fastening members 25 to the support member 2 of the motor-vehicle suspension and results, in an assembled condition, as being interposed between the support member 2 and the brake disc D. The cover 4 has a central opening 27 substantially concentric with the opening 26 of the support member 2, so as to allow the passage of an axle shaft of the motor-vehicle. The main function of the cover 4 is to protect the suspension components from the heat dissipated by the brake disc D and to protect the brake disc D from interference by foreign bodies, such as stones, dust and dirt in general, in particular during driving of the motor-vehicle on particularly uneven roads and/or with no paving.

OBJECT OF THE INVENTION

The object of the present invention is to propose a suspension device for a motor-vehicle wheel with the characteristics indicated at the beginning of the present description that has a lighter structure and is cheaper to produce, compared to known types of devices, without resulting in being less effective in carrying out the functions for which it is designed.

An additional object of the present invention is to provide a motor-vehicle wheel suspension device of the type indicated at the beginning of the present description which, with respect to the known solutions, improves cooling of the motor-vehicle braking system and reduces noises and vibrations that derive from driving the motor-vehicle on particularly uneven or unpaved surfaces.

SUMMARY OF THE INVENTION

In view of achieving the aforesaid objects, the present invention relates to a device having the characteristics indicated at the beginning of this description and further characterized in that said brake caliper is formed in a single piece with said support member by means of additive manufacturing technology.

In the present description and in the claims that follow, the term "additive manufacturing" means a method—known in the art—in which an energy source is used, such as a laser or plasma beam, to selectively melt layers of powders or wires of metal material or plastic material, of various sizes, so as to form layer after layer, a component of metal material or plastic material.

For example, a device for making components using additive manufacturing is known from the document EP 3 148 784 A1, while the European patent application EP 3 470 248 A1 by the same applicant illustrates an example of application of the construction technique described above in the field of motor-vehicle suspensions.

Thanks to the production of a single-piece brake caliper with a motor-vehicle wheel support member, by means of an additive manufacturing technology, the device according to the invention allows reduction of the number of components typically used to produce a support function for the motor-vehicle wheel and to exert a braking action on the brake disc, thus producing a single element that is particularly light and economical to produce with respect to the known solutions.

Preferably, the brake disc cover is also formed in a single piece with said support member and said brake caliper. Thanks to this characteristic, the device according to the invention is even more efficient from the point of view of rationalizing weight and costs, also reducing the noises and vibrations deriving from the movement of the components during driving of the motor-vehicle.

Still according to a preferred embodiment, the device of the invention comprises an air intake arranged to uniformly convey an air flow within said device, so as to dissipate the heat generated by the brake disc. Furthermore, the brake disc cover includes a peripheral portion, at least partially surrounding the brake disc, having a plurality of openings arranged radially along the aforesaid peripheral portion, and arranged to direct said air flow towards the brake disc.

Thanks to these characteristics, the device according to the invention allows effective cooling of the brake disc during driving of the motor-vehicle, avoiding overheating of the disc and of the members connected thereto during prolonged braking phases, thus avoiding a loss of performance of the braking system due to overheating of the disc and brake pads.

All of the above objects are achieved by a device having these and other characteristics recalled in the following claims.

DETAILED DESCRIPTION OF PREFERRED EMBODIMENTS OF THE INVENTION

Further characteristics and advantages of the invention will become apparent from the description that follows with reference to the attached drawings, provided purely by way of non-limiting example, wherein.

In the following description, various specific details are illustrated aimed at a thorough understanding of the embodiments. The embodiments can be implemented without one or more of the specific details, or with other methods, components, materials, etc. In other cases, known structures, constructive details, materials or operations are not illustrated and described in detail, since they can be produced in any known way and also because they do not fall within the scope of the present invention.

FIGS. 3-6 illustrate a preferred embodiment of a suspension device 1 for a motor-vehicle wheel according to the present invention. In FIGS. 3-6, the various parts in common with the known type of device previously described are indicated with the same references used in FIGS. 1 and 2.

In the case illustrated in the drawings, the suspension device 1 can be associated with a front steering and driving wheel suspension; however, the present invention can be applied to suspensions and wheels with different architectures, for example, in association with a non-driving wheel and with a motor-vehicle rear wheel suspension.

As previously stated for the suspension device of the known type described in FIGS. 1 and 2, the device 1 includes a support member 2 of a motor-vehicle wheel, which can be connected to the structure of the motor-vehicle by means of a plurality of suspension members B1, B2, a brake disc D (illustrated in FIGS. 5 and 6) connected in rotation with the wheel of the motor-vehicle, a brake caliper 3 associated with the brake disc D, and a brake disc cover 4 at least partially surrounding the brake disc D.

According to an essential characteristic of the present invention, the brake caliper 3 is formed in a single piece with the support member 2 of the wheel, by means of "additive manufacturing" technology. The term "additive manufacturing" means a method—known in the art—in which an energy source is used, such as a laser or plasma beam, to selectively melt layers of powders or wires of metal material or plastic material, of various sizes, so as to form layer after layer, a component of metal material or plastic material. This production technique is particularly suitable for making components with a particularly complex conformation in a single molding process, wherein the components are traditionally producible in several individual pieces, and subsequently assembled.

In the case of the embodiment illustrated in the drawings, the brake caliper 3, made in a single piece with the support member 2, comprises a main body associated with the brake disc D, having a pair of elongated side portions 24, facing two opposite braking surfaces of the brake disc D and a pair of bridge portions connecting the ends of the side portions 24 and defining at least one ventilation opening 19.

Just as for the known device of FIGS. 1 and 2, a pad-carrying body can be arranged between the elongated side portions 24 of the caliper 3, and is arranged to cooperate with the braking surfaces of the brake disc D. As illustrated in particular in FIGS. 3 and 4, the elongated side portions 24 have two pairs of seats 11 arranged to receive respective actuators configured to exert a thrusting action on the pads, stopping them against the braking surfaces of the disc D, and implementing a braking action on the vehicle. According to a preferred embodiment, the actuators are of the hydraulic type and the walls defining said seats 11 are made of the same material constituting the body of the caliper 3. Additional constructive details relative to the pad-carrying body and to the hydraulic cylinders are not presented here, since these details can be implemented in any known way and also because removal of these details from the drawings makes them more readily and easily understood.

Figure 4:
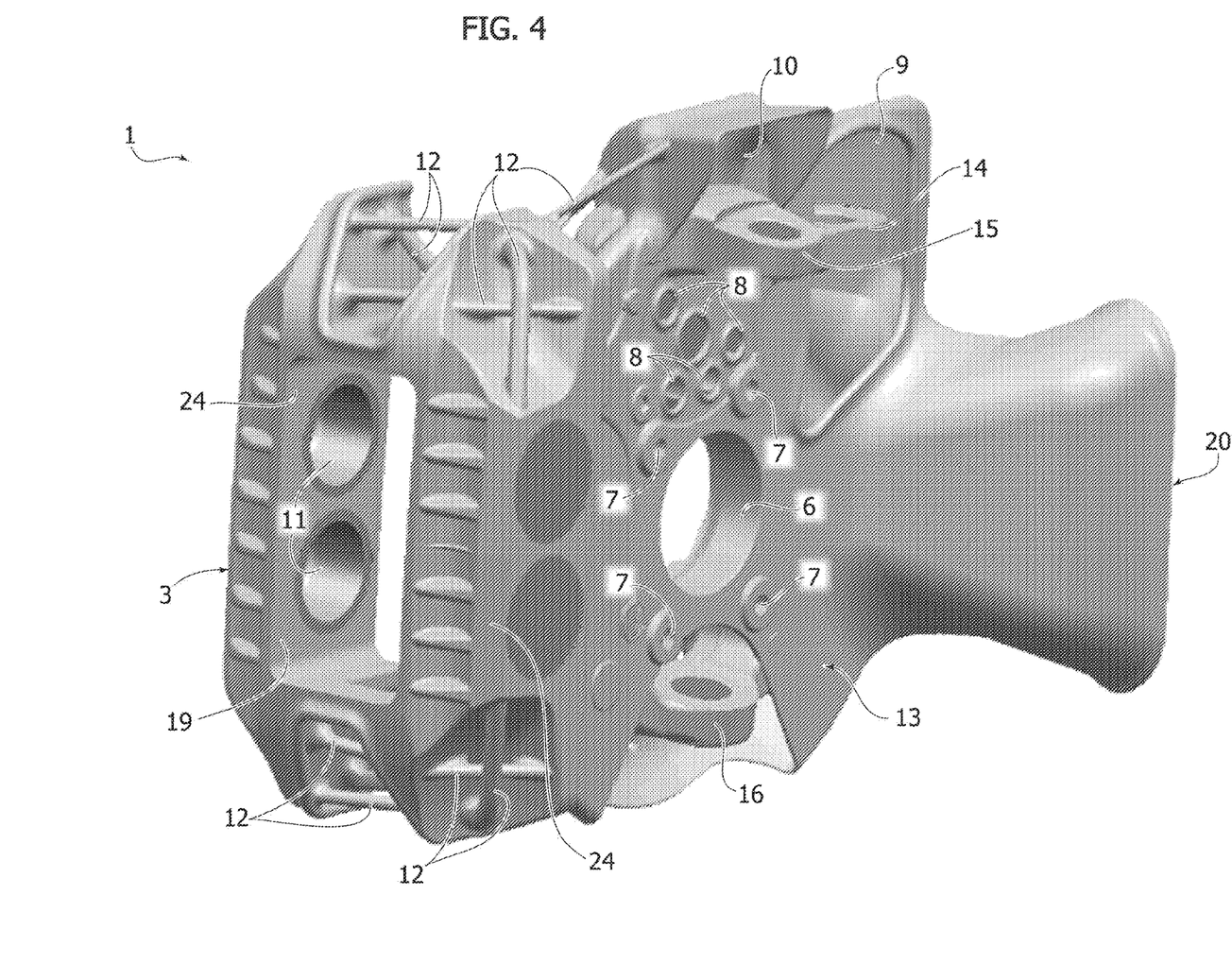
FIG. 4 is an additional perspective view of the details illustrated in FIG. 3, FIGS. 5-6 illustrate additional perspective views of the device of FIGS. 3 and 4, connected to additional suspension members.

With reference in particular to the perspective view of FIG. 4, which illustrates a face 13 of the device 1 intended to face towards the motor-vehicle in its assembled condition, the device 1 comprises a plurality of structural reinforcement arms 12 arranged near the body of the brake caliper 3. The feature of providing the structural reinforcement arms 12 is particularly relevant in the case of the invention, due to the fact that the suspension device 1 is made in a single piece. Preferably, a lower area of the brake caliper 3 is provided with a first series of structural reinforcement arms 12, in particular at an area between the side elongated portions 24. In a similar manner, also an upper area of the brake caliper 3 is provided with a second series of structural reinforcement arms 12. The structural reinforcement arms 12 comprises opposite ends respectively joined with a respective side elongated portion 24 of the brake caliper 2.

Preferably, the series of structural reinforcement arms are made of a plurality of thin arms with different orientation with respect to each other, in order to create a trellis pattern. Some structural reinforcement arms 12 comprise opposite ends respectively joined with one of the side elongated portions 24 of the brake caliper 3. Additionally, in order to further reinforce the device, some reinforcement arms 12 have opposite ends respectively connected to a portion of the brake caliper 3 and to a peripheral area of the brake disc cover 4.

Thanks to the production of the brake caliper 3 in a single piece with the support member 2 of the wheel, according to the characteristics indicated above, the device 1 according to the invention allows reduction of the number of components typically used to produce a support function for the motor-vehicle wheel and exerts a braking action on the brake disc, thus producing a single element that is particularly light and—at the same time—sufficiently robust as required for a support member of a motor-vehicle wheel.

According to a specific embodiment, corresponding to that illustrated in FIGS. 3-6, a brake disc cover 4 is also formed in a single piece with the support member 2 of the wheel and the brake caliper 3. Traditionally, a brake disc cover is configured to at least partially surround a brake disc, in order to protect the brake disc from interference by foreign bodies, such as stones, dust and dirt in general, particularly when the motor-vehicle is driving on particularly uneven and/or unpaved road surfaces.

Figure 3:
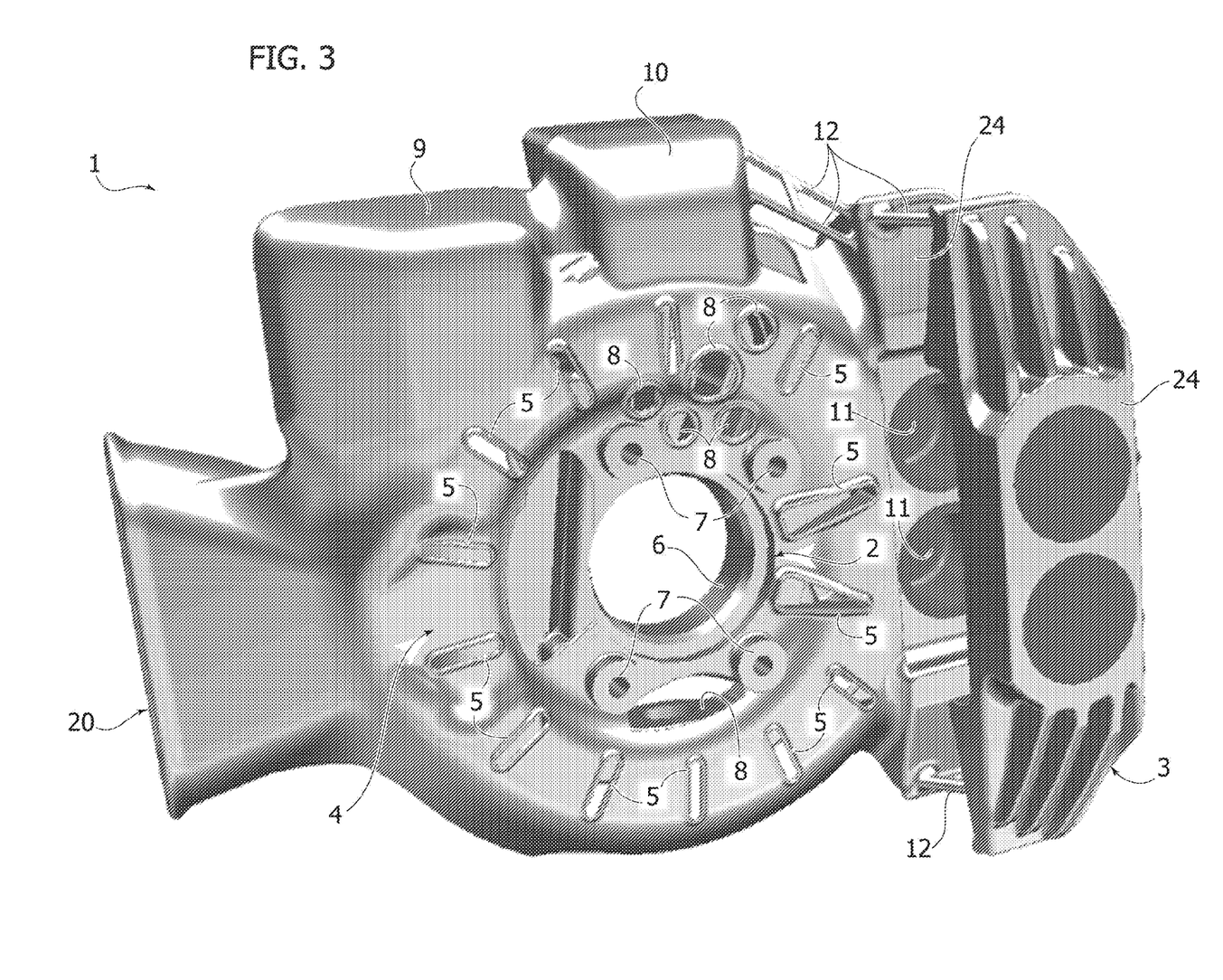
FIG. 3 is a perspective view of a preferred embodiment of a device according to the present invention that can be associated with a motor-vehicle steering drive wheel.

With reference to FIGS. 3 and 4, this embodiment will now be described in more detail.

The device 1 comprises a central perforated portion 6 arranged to receive therein one end of a motor-vehicle axle shaft bearing a wheel pin, in such a way that the assembly consisting of the wheel pin and the central body of the wheel hub is supported in a rotatable manner by the device 1. Preferably, near the said central perforated portion 6, the central body of the device 1 also has a plurality of lightening and/or ventilation openings 8, and a plurality of threaded holes 7 for connecting the said support member 2 to an additional suspension device of the motor-vehicle.

According to an important characteristic of the invention, the device 1 has an air intake 20, shaped in such a way as to uniformly convey an air flow within the device 1 to dissipate the heat generated by the brake disc D during use of the motor-vehicle. Preferably, the air intake 20 is provided at a side portion of the device, opposite to the brake caliper 3. The air intake 20 has a tapered shape with an end portion joined with the brake disc cover.

In order to effectively cool the disc D, the device 1 also comprises a plurality of openings 5 arranged radially in succession at a peripheral portion of the device 1 surrounding the brake disc D, and arranged to direct the flow of air entering the air intake 20 towards the brake disc D.

Thanks to the provision of the air intake 20 and of the openings 5, the device 1 according to the invention also provides, in addition to the function of supporting the wheel of the motor-vehicle associated with the possibility of exercising a braking action of the motor-vehicle, a thermal function, since the device 1 is configured in order to effectively cool the brake disc D during the braking phases. Of course, the air intake 20 and the openings 5 can be oriented and shaped differently from those illustrated in FIGS. 3-6, while at the same time achieving effective cooling of the heat generated by the interference between the brake pads carried by the body of the brake caliper 3 and the braking surfaces of the brake disc D.

Figure 5:
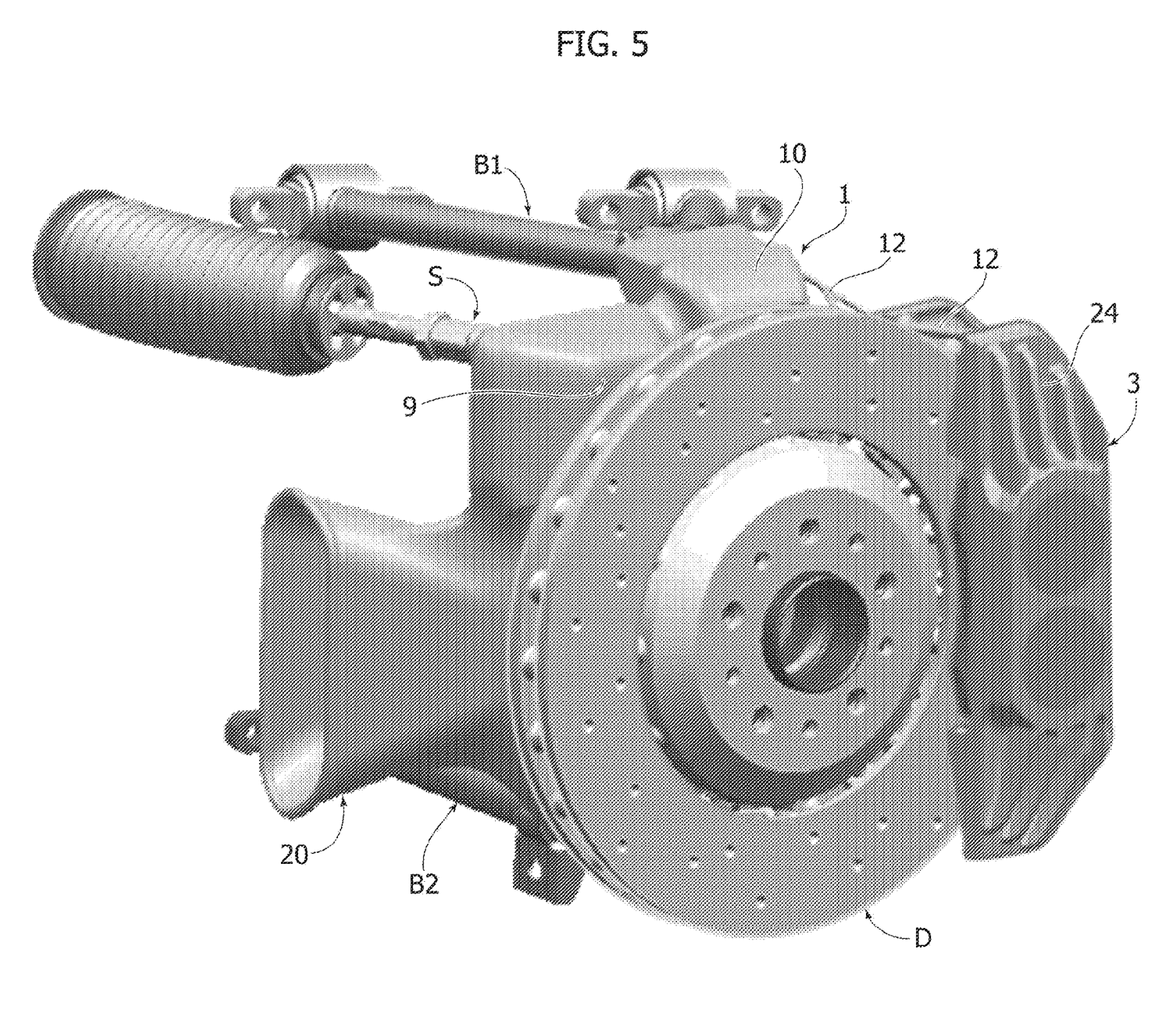
Figure 6:
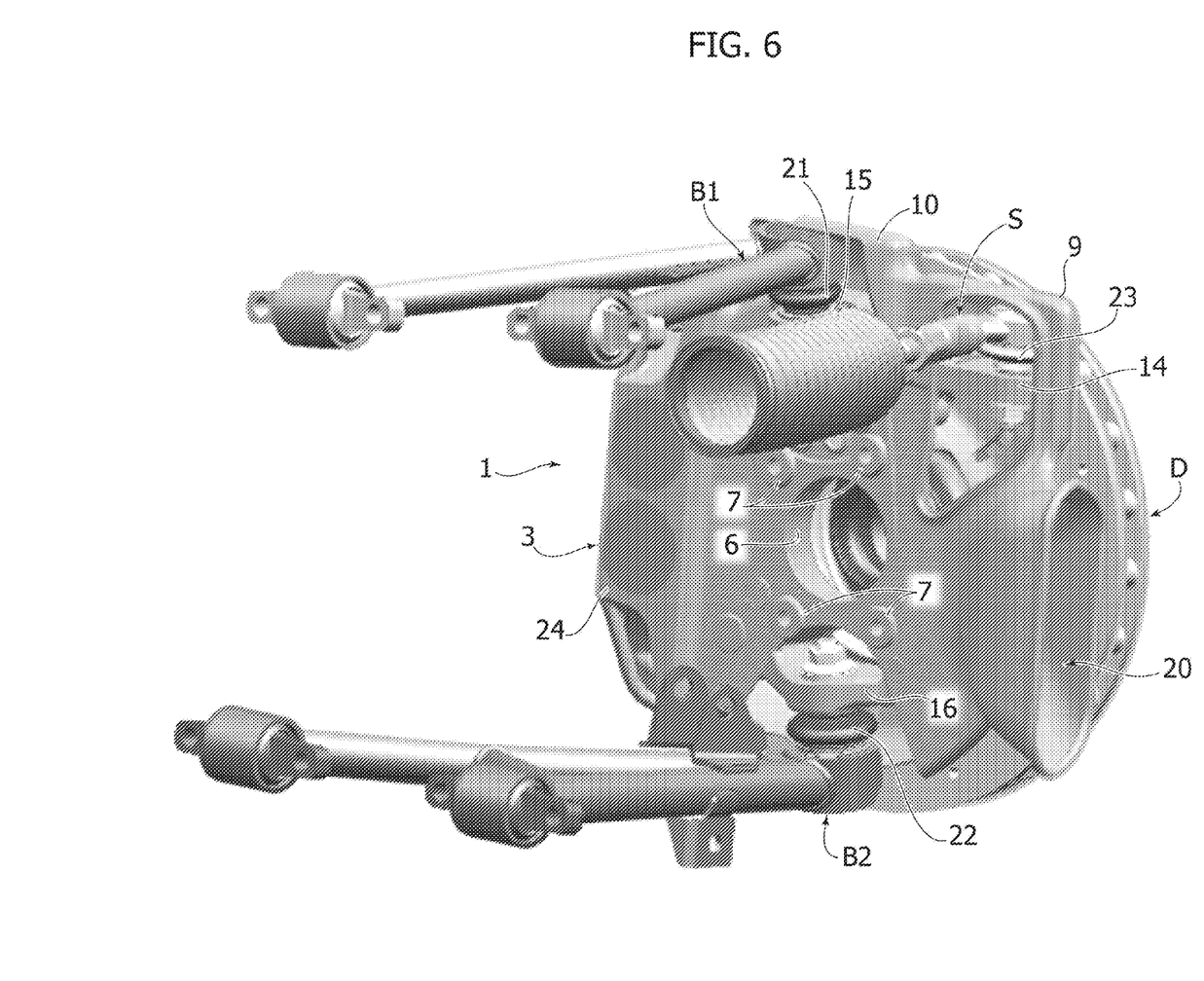

With reference in particular to FIGS. 4-6, at an inner face 13 intended to face towards the inside of the motor-vehicle in its assembled condition, the device 1 includes an upper attachment point 15 for connection to a ball joint 21 of an upper pivoting arm B1 and a lower attachment point 16 for connection to a ball joint 22 of a lower pivoting arm B2. The upper and lower attachment points 15, 16 respectively have a main axis extending in an ideal direction to obtain axes and suspension angles with specific values to respond to the required performance of the vehicle. In the example shown in the drawings, the upper and lower pivoting arms B1, B2 each have a pair of rods shaped so as to create a triangular pivoting arm. A connecting element is arranged at the end of each rod, in the form of an elastic bushing, intended to be connected in a pivoting manner to the body of the motor-vehicle. In the embodiment illustrated in the drawings, the elastic bushings have a main axis directed in a direction substantially perpendicular to the main axes of the ball joints 21, 22.

With reference to FIG. 4, the device 1 comprises an additional attachment point 14, arranged near said upper attachment point 15, for connection to a ball joint 23 of a steering system S associated with the motor-vehicle.

Preferably, the device 1 comprises a first and a second peripheral covering portion 9, 10, configured to cover the ball joint 23 of the steering system S and the ball joint 21 of the upper pivoting arm B1, respectively, so as to protect the suspension members, the connecting rods of the steering system S, and the respective joints 21, 23, as well as the brake disc D, from being hit by stones or dirt during use.

Thanks to all the characteristics described above, the device 1 according to the invention allows the following advantages to be achieved.

Firstly, the brake caliper integrated in a single piece with the aforesaid support member, allows reduction of the number of components typically used to make the aforesaid device (typically the brake caliper is rigidly connected by means of fastening members at attachment points made on the body of the support member), thus creating a structure that is lighter and cheaper to produce.

Secondly, thanks to the provision of a device that also integrates a brake disc cover in a single piece, by means of an additive manufacturing technique, it is possible:

to obtain further rationalization of weight and costs compared to conventional solutions,
to provide a device that presents greater rigidity and NVH (Noise Vibration Harshness) performances compared to conventional solutions and
to provide a device that also contributes to collecting friction material dust.

Moreover, thanks to the conformation of the device that provides an air intake and a plurality of openings arranged radially in succession on a peripheral portion of the cover, the device also operates to effectively cool the brake disc during the braking phases.

Thirdly, thanks to the characteristics indicated above, the device is light but also sufficiently robust as is necessary for a motor-vehicle suspension device which must support the wheel and connect the suspension elements thereto in a stable manner.

Moreover, the present invention is also directed at a motor-vehicle comprising at least two devices according to the invention (for example, a pair of devices for non-drive wheels and/or a pair of devices for steering drive wheels).

Of course, without prejudice to the principle of the invention, the details of construction and the embodiments may vary widely with respect to those described and illustrated purely by way of example, without departing from the scope of the present invention.

The invention claimed is:

1. A suspension device of a motor-vehicle wheel including:
   a motor-vehicle wheel support member, connectable to the motor-vehicle structure by means of one or more suspension members,
   a brake disc connected in rotation with the wheel of the motor-vehicle,
   a brake caliper associated with said brake disc, and
   a brake disc cover rigidly connected to said support member and at least partially surrounding said brake disc,
   wherein said brake caliper is formed in a single piece with said support member by means of additive manufacturing technology, and
   wherein said suspension device comprises an air intake arranged to uniformly convey an air flow within said suspension device, so as to dissipate heat generated by said brake disc during execution of a braking phase on the motor-vehicle.

2. The suspension device according to claim 1, wherein said brake disc cover is formed in a single piece with said support member and said brake caliper.

3. The suspension device according to claim 2, wherein said suspension device has a body comprising a plurality of lightening openings and a central perforated portion arranged to receive therein an end of a motor-vehicle axle shaft.

4. The suspension device according to claim 3, wherein said support member comprises, near said central perforated portion, a plurality of holes for connecting said support member to an additional suspension member of the motor-vehicle.

5. The suspension device according to claim 1, wherein said air intake is located at a lateral portion of the suspension device, opposite to the brake caliper, said air intake having a tapered shape with an end portion joined with the brake disc cover.

6. The suspension device according to claim 1, wherein said cover includes a peripheral portion, at least partially surrounding the brake disc, having a plurality of openings arranged radially along said peripheral portion and arranged to direct said air flow towards the brake disc.

7. The suspension device according to claim 1, wherein said suspension device, at an inner face intended to face towards an inside of the motor-vehicle in its assembled condition, includes an upper attachment point for connection to a ball joint of an upper pivoting arm and a lower attachment point for connection to a ball joint of a lower pivoting arm, said upper and lower attachment points respectively having a main axis extending in a substantially vertical direction.

8. The suspension device according to claim 7, wherein said device comprises an additional attachment point, arranged near said upper attachment point, for connection to a ball joint of a steering system.

9. The suspension device according to claim 1, wherein said brake caliper includes a main body fixedly mounted with respect to the brake disc, wherein said main body comprises two elongated side portions each facing a respective braking surface of the brake disc.

10. The suspension device according to claim 9, wherein said brake caliper comprises at least one pair of seats formed on said main body, arranged to receive respective hydraulic cylinders configured to guide movement of a brake pad-carrying body arranged within said main body and exerting a braking action on said brake disc.

11. The suspension device according to claim 9, wherein said brake caliper comprises a plurality of structural reinforcement arms.

12. The suspension device according to claim 11, wherein said plurality of structural reinforcement arms are a plurality of thin arms with different orientation with respect to each other, in order to create a trellis pattern.

13. The suspension device according to claim 12, wherein said plurality of structural reinforcement arms comprise:
   a first series of structural reinforcement arms located at a lower area of the brake caliper between two side elongated portions of the brake caliper, and
   a second series of structural reinforcement arms located in an upper area of the brake caliper between the side elongated portions.

14. The suspension device according to claim 12, wherein, in order to further reinforce the suspension device, some of the reinforcement arms have opposite ends respectively connected to a portion of the brake caliper and to a peripheral area of the brake disc cover.

15. The motor-vehicle having at least one pair of suspension devices according to claim 1.

16. A suspension device of a motor-vehicle wheel, including:
   a motor-vehicle wheel support member, connectable to the motor-vehicle structure by means of one or more suspension members,
   a brake disc connected in rotation with the wheel of the motor-vehicle,
   a brake caliper associated with said brake disc, and
   a brake disc cover rigidly connected to said support member and at least partially surrounding said brake disc,
   wherein said brake caliper is formed in a single piece with said support member by means of additive manufacturing technology,
   wherein said suspension device, at an inner face intended to face towards an inside of the motor-vehicle in its assembled condition, includes an upper attachment point for connection to a ball joint of an upper pivoting arm and a lower attachment point for connection to a ball joint of a lower pivoting arm, said upper and lower attachment points respectively having a main axis extending in a substantially vertical direction,
   wherein said device comprises an additional attachment point, arranged near said upper attachment point, for connection to a ball joint of a steering system, and
   wherein said device comprises a first and a second peripheral covering portion, arranged so as to cover said ball joint of said steering system and said ball joint of said upper pivoting arm, respectively.

* * * * *